United States Patent
Allezy et al.

(10) Patent No.: US 7,856,735 B2
(45) Date of Patent: Dec. 28, 2010

(54) MEASURING TAPE WITH THERMAL DEPLOYMENT AND DEPLOYABLE STRUCTURE COMPRISING SAID MEASURING TAPE

(75) Inventors: Arnaud Allezy, San Francisco, CA (US); Laurent Blanchard, Mouans-Sartoux (FR); Christian Hochard, Marseille Cedex (FR); François Guinot, Marseille Cedex (FR)

(73) Assignees: Thales (FR); Centre National de la Recherche Scientifique (FR); Universite de Provence (FR)

( * ) Notice: Subject to any disclaimer, the term of this patent is extended or adjusted under 35 U.S.C. 154(b) by 12 days.

(21) Appl. No.: 12/500,945

(22) Filed: Jul. 10, 2009

(65) Prior Publication Data

US 2010/0031525 A1     Feb. 11, 2010

(30) Foreign Application Priority Data

Jul. 11, 2008     (FR) .................................. 08 03986

(51) Int. Cl.
*G01B 3/10* (2006.01)
(52) U.S. Cl. .......................................... 33/771; 33/755
(58) Field of Classification Search .............. 33/755, 33/771
See application file for complete search history.

(56) References Cited

U.S. PATENT DOCUMENTS

| | | | |
|---|---|---|---|
| 4,931,366 A * | 6/1990 | Mullaney, Jr. ................. 33/769 |
| 6,499,226 B1 * | 12/2002 | Reda et al. ..................... 33/771 |
| 7,065,895 B2 * | 6/2006 | Hoopengarner ............... 33/771 |
| 2002/0129509 A1 * | 9/2002 | Evans, III ...................... 33/757 |
| 2005/0252020 A1 * | 11/2005 | Critelli et al. .................. 33/755 |
| 2006/0042111 A1 * | 3/2006 | Hoopengarner ............... 33/760 |
| 2008/0290221 A1 | 11/2008 | Dupuis et al. | |

FOREIGN PATENT DOCUMENTS

EP     0363919     4/1990

OTHER PUBLICATIONS

U.S. Appl. No. 12/159,932, filed Dec. 29, 2006, Laurent Blanchard, et al.
U.S. Appl. No. 12/159,890, filed Dec. 29, 2006, Jean Dupuis, et al.
Campbell D. et al: Development of a Novel, Passively Deployed Roll-Out Solar Array, Aerospace Conference, 2006 IEEE Big Sky, MT USA, Mar. 4-11, 2006.

* cited by examiner

*Primary Examiner*—G. Bradley Bennett
(74) *Attorney, Agent, or Firm*—LaRiviere, Grubman & Payne, LLP

(57) ABSTRACT

The invention relates to a measuring tape (10) comprising a stack of at least two layers, characterized in that it also includes a first layer, called support layer, based on composite material (11) and a layer, called top layer, (12) based on a polymer having a high glass transition temperature so that, in conditions of use, said polymer is in a glassy state to maintain the element in the wound or folded position.

The invention also relates to a deployable structure including said measuring tape intended notably for space applications.

14 Claims, 4 Drawing Sheets

MEASURING TAPE WITH THERMAL DEPLOYMENT AND DEPLOYABLE STRUCTURE COMPRISING SAID MEASURING TAPE

PRIORITY CLAIM

This application claims priority to French Patent Application Number 08 03986, entitled Measuring Tape With Thermal Deployment And Deployable Structure Comprising Said Measuring Tape, filed on Jul. 11, 2008.

BACKGROUND OF THE INVENTION

The field of the invention is that of deployable structures that can advantageously be used in deployable telescopes or in any other space of other system.

Currently, the increasing demands for high resolution, both for observation of the Earth from space and for deep space observation (detecting objects that are very weakly lit while maintaining the exposure time within the limits imposed by the stabilisation capability), necessitate increasingly large space observation systems.

Moreover, missions of observation of the Earth from a geostationary orbit can be envisaged with the associated gains (greater thermal stability, fewer disturbances due to gravity, permanent observation above an area) but, given the distance, require greater aperture areas.

To successfully complete these missions, very large telescopes have to be designed and, in most cases, their dimensions exceed the available volume in the nosecone of the launch vehicle.

The design of such systems brings with it many technological challenges such as the development of deployable structures of large dimensions and active systems that can be used to correct the positioning uncertainties after deployment.

The technical problem targeted by the present invention is that of the design of structural elements, the length of which can increase autonomously once the satellite is in station.

There are various deployable structural concepts already in existence: articulated rigid structures (pantographic systems for example), systems relying on the principle of tensegrities (structural assembly in a stable self-constrained state, consisting of a discontinuous set of bars all working in compression mode, linked to a continuous set of cables all working in tension mode), foldable composite bars, flexible membrane type structures, inflatable polymerisable bars, alloys with shape memory, but also bars of measuring tape type.

The applicant has already studied and proven the potential of a telescope structure founded on a hexapod, the legs of which are made up of bars of measuring tape type.

However, it has been shown, by associated deployment modelling and testing, that the deployment of the measuring tapes is very violent and it is difficult to obtain sufficient reliability to allow for autonomous deployment from the platform.

It is possible then to envisage performing this deployment either by means of motors, or by means of a regulation mechanism (for example, a mechanism used in the deployment of the solar panels relying on the use of inertial, viscous dissipation, fluid shear and other such systems). In all cases, these solutions are relatively complex and potential sources of failures.

More specifically, to produce self-deployable measuring tape structures, it has already been proposed to associate two materials comprising a polymer resin with shape memory with which to fix the tape in its wound configuration then force it to be unwound under the effect of a rise in temperature and a composite material with bistable lay-up. This type of lay-up allows a transition from the wound state to the unwound state and vice versa by having to cross only a very small energy jump. Furthermore, each of the two states being a stable state, the tape can remain wound with no holding force.

Nevertheless, this type of solution uses sophisticated materials that are expensive and unavailable in large quantities.

Resins with shape memory necessitate a first initial state in which the material must be deformed by heating it, then by fixing the imposed deformation.

SUMMARY OF THE INVENTION

In this context, the subject of the present invention is a novel type of measuring tape making it possible to overcome the abovementioned drawbacks.

More specifically, the subject of the present invention is a measuring tape comprising a stack of at least two layers, characterized in that it also includes a first layer, called support layer, based on composite material and a layer, called top layer, based on a polymer having a high glass transition temperature so that said polymer is in a glassy state to maintain the element in the wound or folded position.

According to a variant of the invention, the polymer is of polyethyleneterephthalate (PET) type having a glass transition temperature of the order of 67° C.

According to a variant of the invention, the polymer is of polyvinyl chloride type having a glass transition temperature between approximately 80° C. and 85° C.

According to a variant of the invention, the polymer is of atactic polymethyl methacrylate type having a glass transition temperature of the order of 107° C.

According to a variant of the invention, the composite material is a laminated material of long carbon/epoxy resin fibre type.

According to a variant of the invention, the top layer also includes elements of glued or screen-printed heating resistor type.

According to a variant of the invention, the measuring tape also comprises an intermediate adhesive layer between the layer of composite material and the top layer of polymer.

According to a variant of the invention, the thickness of the top layer of polymer is around 0.5 millimeters.

The thickness of the support layer can be around 0.2 millimeters and the deployable element can have a length of around a meter and a width of around 60 millimeters.

Another subject of the invention is a deployable structure, characterized in that it also comprises:
  measuring tapes according to the invention;
  means of winding said measuring tapes;
  a platform to be deployed by the unwinding of the measuring tapes;
  means for heating the top layer of polymer.

According to a variant of the invention, the deployable structure includes a hexapod structure comprising six measuring tapes.

According to a variant of the invention, the structure also includes a base support and means of fixing the winding means onto said base support.

According to a variant of the invention, the deployable structure also includes an optical component positioned on the platform.

BRIEF DESCRIPTION OF THE DRAWINGS

The invention will be better understood and other advantages will become apparent from reading the description that follows given as a nonlimiting example and from the appended figures in which.

DETAILED DESCRIPTION

The idea on which the present invention is based relies on the combined use of two materials to produce a structure called prestressed measuring tape with thermally actuated and regulated deployment.

The invention will be described in the context of a wound measuring tape but can also be declined in the context of a folded measuring tape.

Figure 1:
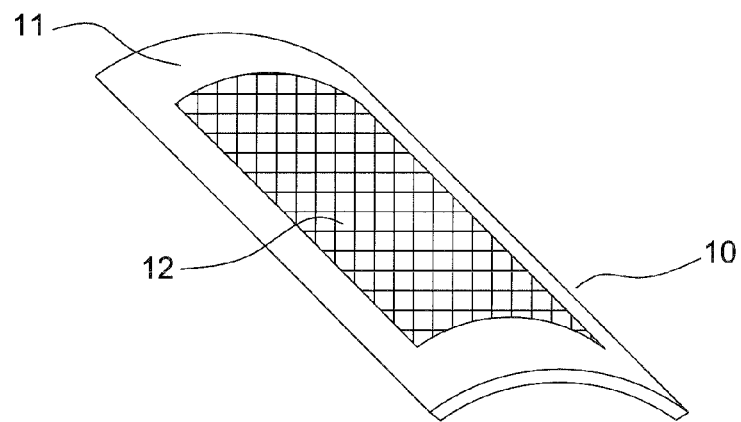
FIG. 1 represents a section of measuring tape according to the invention and having a transversal curvature.

FIG. 1 diagrammatically represents the measuring tape 10 according to the invention comprising a support layer 11 and a top layer 12 comprising the polymer that has a high glass transition temperature.

Figure 2:
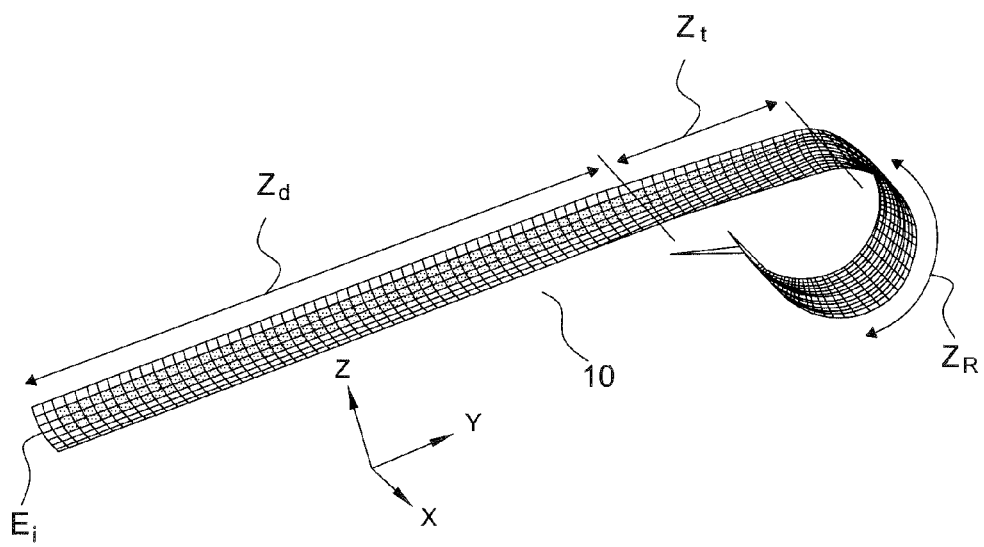
FIG. 2 represents a measuring tape structure according to the invention that is being unwound.

FIG. 2 represents in more detail the various areas of the measuring tape during deployment. A first end Ei is generally joined to an element that is not represented. The measuring tape 10 comprises an unwound area Zd, a transition area Zt subject to a temperature rise making it possible to strongly reduce the rigidity of the so-called top layer based on polymer and an area Zr wound previously and that has not been heated.

In the initial position, the measuring tape is thus wound on itself and can be deployed according to the invention under the action of heat which modifies the behaviour of the so-called polymer-based top layer.

The measuring tape thus consists of one or more layers of a first material that can be, for space applications, a laminated composite of long carbon/epoxy resin fibre type joined to one or more layers of a polymer exhibiting a strong variation in rigidity between its glassy state and its rubbery state, the glassy state being the state of the material for temperatures below its glass transition temperature and the rubbery state that for higher temperatures.

The composite layer(s) have a measuring tape-type geometry, that is to say, the geometry of a tape having a transversal curvature.

At least one layer of polymer is attached to the composite layer. Below its glass transition temperature, designated Tg, the layer of polymer is sufficiently rigid to maintain the measuring tape in its wound state.

When a localised heating is applied that brings the polymer above its glass transition temperature Tg, the latter has its stiffness reduced and thus gradually releases its tension over the composite. The measuring tape is then unwound spontaneously and progressively in line with the local reheating of the layer of polymer.

Thus, the proposed solution relies on the combination of a measuring tape made of composite material and a second layer of a standard polymer material. This system makes it possible to deploy, under the effect of a local or general temperature rise, the measuring tape with slow and controllable kinetics.

Various polymers can be envisaged, but they must all have the following properties:
- a strong variation in rigidity between the glassy state and the rubbery state,
- the glass transition temperature must be compatible with the planned application. The glass transition temperature must therefore be greater than the temperatures to which the system will be exposed before its deployment. However, once the measuring tape, or the structure comprising measuring tapes, is deployed, the latter can be used at temperatures higher than the glass transition temperature Tg since the composite layer is in its stable state and cannot therefore be rewound on its own.

For space applications at 20° C., a material such as polyethyleneterephthalate (PET) having a significant jump in rigidity around Tg=67° C. is well suited. Other materials such as polyvinyl chloride (80<Tg<85° C.) or atactic polymethyl methacrylate (Tg=107° C.) can also be envisaged.

Moreover, the layers of polymer must be attached to the composite layer. This can be done by gluing, by means of an adhesive, and appropriate surface treatments (chemical etch, corona discharge, plasma treatment). Producing a coating in the molten state or in a solvent can also be envisaged. Another solution may be the direct polymerisation of the polymer on the composite layer.

Once the polymer layer is attached to the composite layer, it is possible to produce the first wind or fold.

The assembly is brought to a temperature above the glass transition temperature Tg of the polymer material. In this state, the polymer has its rigidity reduced so making it possible to easily achieve the winding or folding of the composite layer.

The wound configuration is then fixed by a drop in temperature below the glass transition temperature Tg.

Below this glass transition temperature Tg, the layer of polymer becomes rigid and can then counter the natural unwinding force of the composite layer. The measuring tape is then fixed in its wound configuration.

When heating is applied, bringing the material above the glass transition temperature Tg, the polymer once again exhibits a stiffness that diminishes and can thus progressively release the tension on the measuring tape. The latter is then unwound spontaneously and gradually in line with the local reheating of the layer of polymer.

To achieve the unwinding of the proposed measuring tape, it is necessary to apply a restricted localised heating to the transition area of the measuring tape, that is, the portion of the tape that is situated between the wound portion and the unwound portion.

Figure 3:
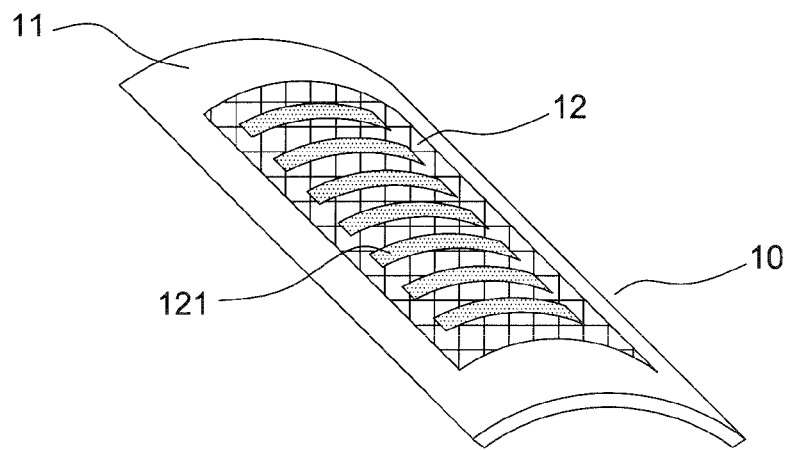
FIG. 3 represents a variant measuring tape according to the invention including integrated resistors.

The localised heating can be produced in different ways:
- by means of an infrared lamp positioned facing the transition area,
- by means of heating resistors glued or screen-printed on the measuring tape, the actuation of which is achieved sequentially in line with the deployment, as illustrated in FIG. 3 which represents a measuring tape including heating resistors 121 in the polymer surface,
- by exposure to solar radiation.

Thus, the measuring tape can be deployed without having to use a motor and with gentle and controllable kinematics.

The use of this type of measuring tape that can be thermally unwound can advantageously be envisaged for the production of a deployable hexapod prototype intended for future space telescope structures. The design relies on replacing the metal measuring tapes and their mechanisms with measuring tapes that can be thermally unwound. Thus, the thermal actuation makes it possible to progressively unwind each tape of the hexapod, ensuring the positioning of the top platform without impact.

Figure 4:
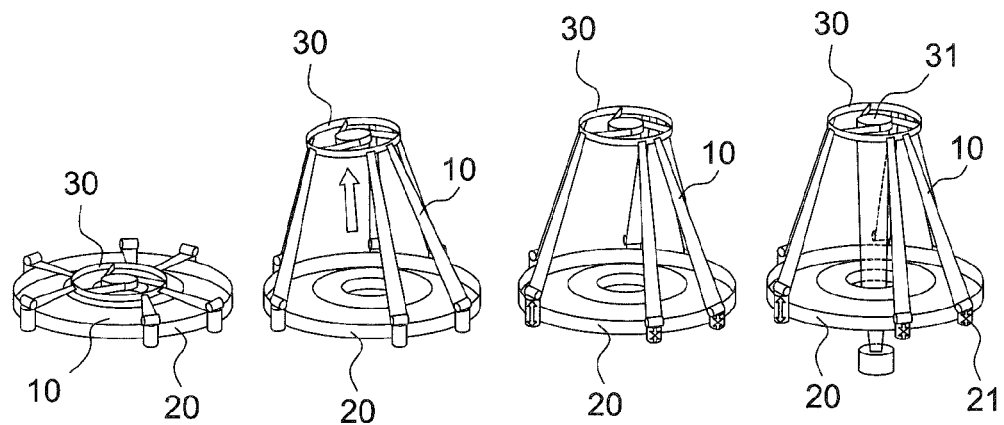
FIG. 4 illustrates the changes to a structure during deployment using measuring tapes according to the invention.

FIG. 4 illustrates the deployment of a hexapod-type structure comprising measuring tapes, the unwinding of which is used to deploy an object. The existence of the light beam represented in the figure signifies that the deployed structure is correctly positioned. For example, it signifies that the platform 30 is correctly positioned relative to the base 20. This beam corresponds, for example, to the optical path between the secondary mirror positioned on the platform 30 and a receiver situated under the base 20, so it is only possible if the receiver, linked to the base 20, and the secondary mirror positioned on the platform 30, are correctly aligned.

The hexapod structure more specifically comprises six measuring tapes 10, joined on the one hand to a base 20 via means 21 and a platform 30 via means 31. The base is, moreover, equipped with means 22 of winding the measuring tapes 10.

In the initial position, a small portion of the measuring tapes is deployed.

Progressively, and using heating means that are not represented, the measuring tapes are deployed and at the same time are used to deploy the top platform 30 generally supporting a component 32 of optical type. The top platform 30 can, for example, include a secondary mirror with which to return the light beam from the primary mirror, supported by the base 20, to a receiver fixed behind the latter.

FIGS. 5a to 5d illustrate the various component elements of the hexapod structure, being able advantageously to be employed in a telescope structure, the legs of which are made up of measuring tapes linked on the one hand to a top platform on which the object to be deployed is positioned, typically an optical component, and a bottom base.

Figure 5A:
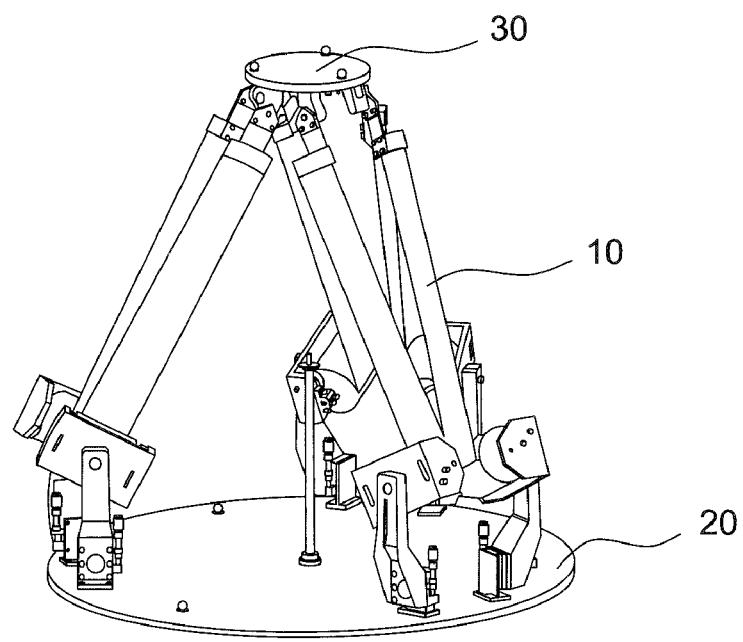
FIGS. 5a to 5d illustrate the various elements of a hexapod structure using measuring tapes according to the invention that can be onboard a spacecraft.

FIG. 5a is a perspective view of the measuring tapes according to the invention used to deploy an object of optical component type.

Figure 5B:
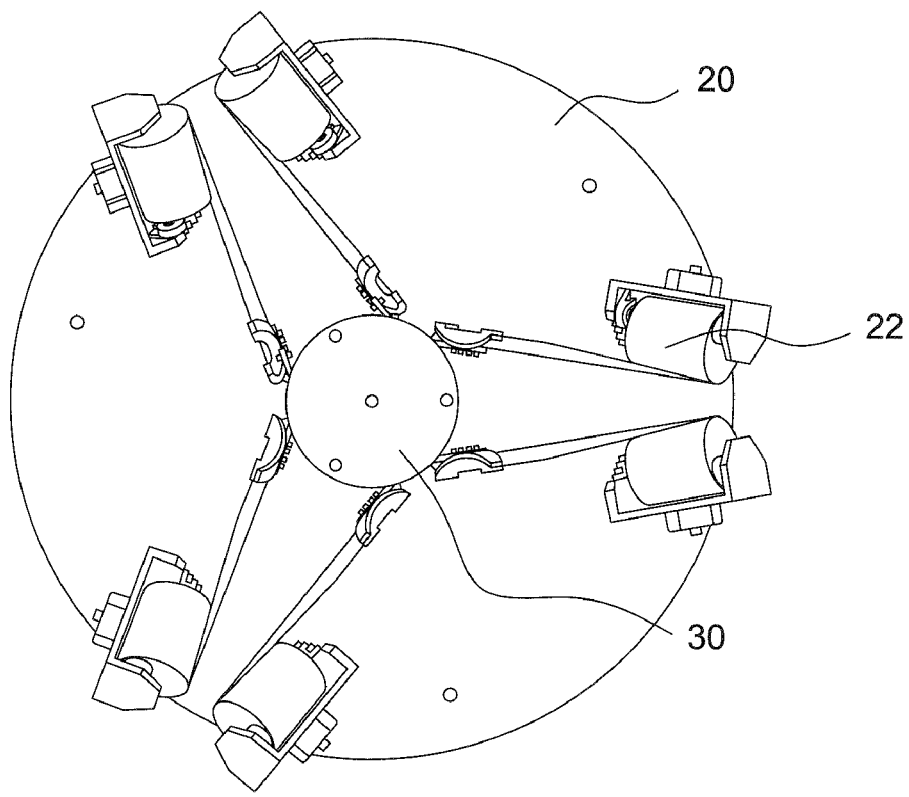

FIG. 5b represents a plan view of the object to be deployed linked to the ends of the measuring tapes.

Figure 5C:
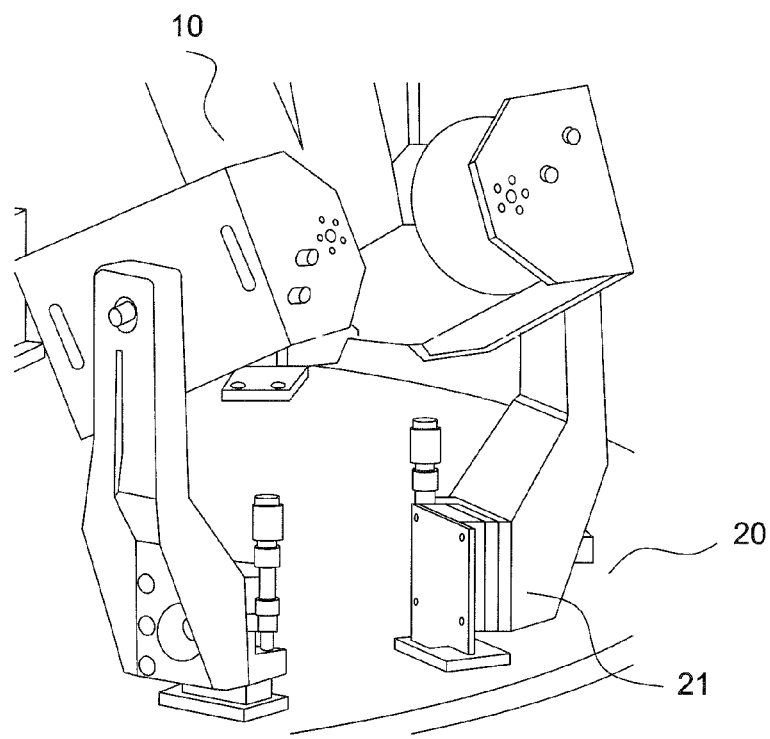

FIG. 5c is a view of the base of the feet of the hexapod and the winding mechanisms.

Figure 5D:
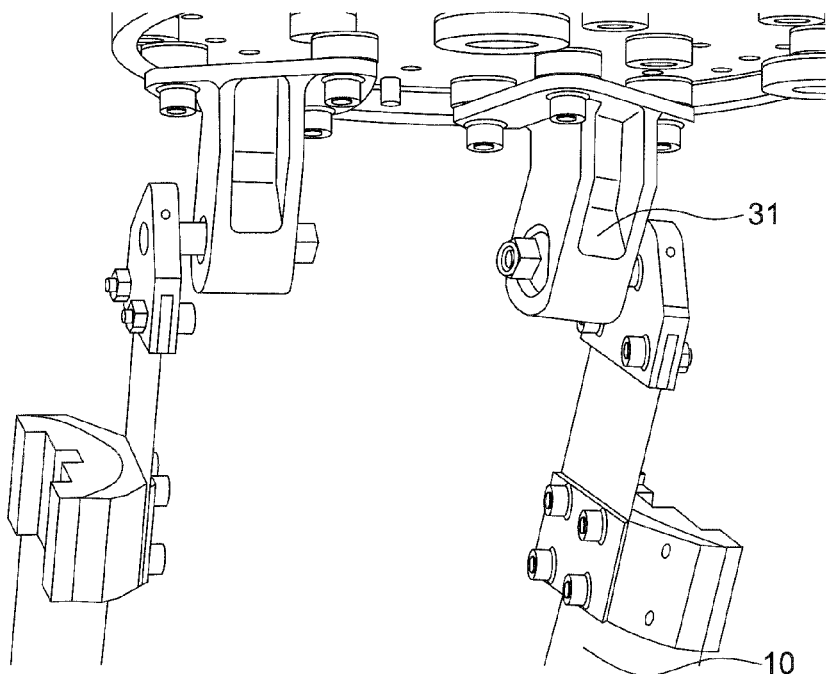

FIG. 5d is a view of the interfaces linking the measuring tapes to the top platform.

The main advantages of this solution are its great simplicity and its robustness: no mechanism is needed for the deployment. Furthermore, once this is done, the tapes are as if "locked" by the polymer, which ensures that the latter cannot be rewound.

Furthermore, the deployment is done with relatively slow and controlled kinematics, which ensures very low impacts at end of travel (unlike metal tapes).

The invention described does not require the use of resins with shape memory. It uses a standard polymer material which is much less expensive and more widely available.

The invention claimed is:

1. Measuring tape (10) comprising a stack of at least two layers, comprising a first layer, called support layer, based on composite material (11) and a layer, called top layer, (12) based on a polymer having a high glass transition temperature so that, in conditions of use, said polymer is in a glassy state to maintain the element in the wound or folded position.

2. Measuring tape according to claim 1, wherein the polymer is of polyethyleneterephthalate (PET) type having a glass transition temperature of the order of 67° C.

3. Measuring tape according to claim 2, wherein the polymer is of polyvinyl chloride type having a glass transition temperature between approximately 80° C. and 85° C.

4. Measuring tape according to claim 2, wherein the polymer is of atactic polymethyl methacrylate type having a glass transition temperature of the order of 107° C.

5. Measuring tape according to one of claims 1 to 2, wherein the composite material is a laminated material of carbon/epoxy type.

6. Measuring tape according to one of claims 1 to 2, wherein the top layer also includes elements (121) of glued or screen-printed heating resistor type.

7. Measuring tape according to one of claims 1 to 2, comprising an intermediate adhesive layer between the layer of composite material and the top layer of polymer.

8. Measuring tape according to one of claims 1 to 2, wherein the thickness of the top layer of polymer is around 0.5 millimetres.

9. Measuring tape according to one of claims 1 to 2, wherein the thickness of the support layer is around 0.2 millimetres.

10. Measuring tape according to one of claims 1 to 2, wherein the deployable element has a length of around a metre and a width of around 60 millimetres.

11. Deployable structure, characterized in that it also includes:
   measuring tapes (10) according to one of claims 1 to 2;
   means of winding said measuring tapes;
   a platform (30) to be deployed by the unwinding of the measuring tapes;
   means of unwinding the measuring tapes (22) comprising means for heating the top layer of polymer.

12. Deployable structure according to claim 11, including a hexapod structure comprising six measuring tapes.

13. Deployable structure according to claim 11, comprising a base (20) and means (21) of fixing the winding means onto said base.

14. Deployable structure according claims 11, comprising an optical component (23) positioned on the platform.

* * * * *